(12) United States Patent
Semprini

(10) Patent No.: US 6,659,401 B1
(45) Date of Patent: Dec. 9, 2003

(54) AIRPLANE DOOR LOCK SYSTEM

(76) Inventor: Robert M. Semprini, 11 Delmar La., Commack, NY (US) 11725

( * ) Notice: Subject to any disclaimer, the term of this patent is extended or adjusted under 35 U.S.C. 154(b) by 0 days.

(21) Appl. No.: 10/293,467

(22) Filed: Nov. 13, 2002

(51) Int. Cl.[7] .................................. B64C 1/14
(52) U.S. Cl. ............................... 244/118.5; 244/129.5; 49/372
(58) Field of Search ............... 49/323, 372; 244/118.5, 244/118.6, 118.1, 118.2, 129.1, 129.4, 129.5

(56) References Cited

U.S. PATENT DOCUMENTS

| | | | |
|---|---|---|---|
| 3,658,277 A | * 4/1972 | Anderson | 244/1 R |
| 3,680,499 A | * 8/1972 | Boudrean | 109/29 |
| 3,704,845 A | * 12/1972 | Ord | 244/1 R |
| 3,811,643 A | * 5/1974 | Pizzo | 244/141 |
| 4,481,887 A | 11/1984 | Urbano | |
| 4,681,286 A | * 7/1987 | Church et al. | 244/129.5 |
| 4,741,275 A | 5/1988 | Lewiner et al. | |
| 4,899,960 A | * 2/1990 | Hararat-Tehrani et al. | 244/118.5 |
| 4,989,808 A | 2/1991 | Spraggins et al. | |
| 5,479,162 A | 12/1995 | Barger et al. | |
| 5,743,487 A | * 4/1998 | Rice | 244/1 R |
| 5,855,253 A | 1/1999 | Bourgeois | |
| 6,158,692 A | * 12/2000 | Abild et al. | 244/129.5 |
| 6,186,444 B1 | 2/2001 | Steel | |
| 6,474,599 B1 | * 11/2002 | Stomski | 244/118.5 |
| 6,484,449 B1 | * 11/2002 | Artsiely | 49/506 |
| 6,499,693 B1 | * 12/2002 | Rogson | 244/118.5 |
| 6,523,779 B1 | * 2/2003 | Michel | 244/118.5 |
| 2002/0092951 A1 | * 7/2002 | Haviv | 244/118.5 |
| 2002/0158166 A1 | * 10/2002 | Lin | 244/118.5 |
| 2003/0006342 A1 | * 1/2003 | Page, Jr. | 244/118.5 |
| 2003/0047648 A1 | * 3/2003 | Batt et al. | 244/118.5 |
| 2003/0052225 A1 | * 3/2003 | Butzlaff | 244/118.5 |
| 2003/0052779 A1 | * 3/2003 | Martin et al. | 340/351 |
| 2003/0058112 A1 | * 3/2003 | Gleine | 340/573.1 |
| 2003/0062446 A1 | * 4/2003 | Arias | 244/118.5 |
| 2003/0062447 A1 | * 4/2003 | Cordina et al. | 244/118.5 |
| 2003/0062448 A1 | * 4/2003 | Takeshima | 244/118.5 |
| 2003/0066929 A1 | * 4/2003 | Valencia et al. | 244/3 |
| 2003/0066930 A1 | * 4/2003 | Pratt et al. | 244/118.5 |
| 2003/0071171 A1 | * 4/2003 | Suchar | 244/118.5 |
| 2003/0075644 A1 | * 4/2003 | Temple et al. | 244/118.5 |
| 2003/0080248 A1 | * 5/2003 | Morgan | 244/118.5 |
| 2003/0080249 A1 | * 5/2003 | Raczkowski | 244/118.5 |

* cited by examiner

Primary Examiner—Charles T. Jordan
Assistant Examiner—Stephen A Holzen
(74) Attorney, Agent, or Firm—Dilworth & Barrese, LLP

(57) ABSTRACT

A door lock system for an airplane is operative to alternately operate spaced doors to provide controllable entry into a restricted area located between the spaced doors.

16 Claims, 6 Drawing Sheets

AIRPLANE DOOR LOCK SYSTEM

BACKGROUND

1. Technical Field

The invention relates to a door lock system installed on board an aircraft and operative to controllably and selectively open and close multiple passage barriers. In particular, the invention relates to a door lock system providing controllable access to restricted areas on board an aircraft.

2. Background of Related Art

As part of administrative efforts to increase aircraft security, the U.S. Department of Transportation's Federal Aviation Administration (FAA) recently announced plans to distribute $100 million that Congress appropriated for security enhancements to aircraft flight decks and cabins. Funds will soon be distributed to air carriers to install video and other technology for use in the cabin and to fortify flight deck doors. Primarily, the latter involves improving locks and other barriers already installed, as well as permanent design changes that must be in place by April 2003. "Preventing unauthorized access to the cockpit is one of our highest priorities, but it's also essential that the flight crew and cabin crew have technology to help them work as a team in a threat situation," said the FAA. The President announced on Sep. 28, 2001 that he was requesting funding from Congress to help the U.S. airline and cargo industry finance cockpit door modifications and alerting systems.

Current doors are not adequately designed to minimize or mitigate the negative impacts from breaches caused by blunt force, ballistics, fragmentation, or other explosive. Typically, strengthening of the flight deck door can be divided into the following areas: improved locking, hinge, door handle, and doorframe integrity.

One of the known designs relates to a so-called "plug" type door system with a door panel supported for sequential movement between a door closed position, wherein the door panel is prevented from lateral opening movements, and a door open position with the door panel pivoted and moved to a position conforming to an outside contour of the aircraft body adjacent the door frame.

In the door system of this type known from U.S. Pat. No. 5,163,639, separate electric motors are provided for raising and lowering, pivoting inward and outward, and locking of the door panel in the completely closed position. This door system has a limited functional reliability, because if only one of the electric motors or the program control fails, the entire door system will malfunction, potentially in the open position.

A door lock system for selectively operating adjacent doors to secure or control access into a space therebetween is well known and widely used to monitor access to the banks, stores and buildings. However, such systems have not been developed for aircraft building industry.

It is, therefore, desirable to provide restricted areas on board aircraft and particularly, its cockpit area, with a door lock system minimizing the possibility of unauthorized entry into the pilot's cabin.

SUMMARY OF THE INVENTION

It is an object of the invention to provide a door lock system minimizing the risk of unauthorized entry into restricted areas on board an aircraft.

Another object of the invention is to provide the door lock system including a system for monitoring the restricted area and for alarming authorized personnel in case of emergency.

Yet a further object of the invention is to provide the slideable barriers of the inventive lock system with an adjustable structure operative to conform to the shape of the fuselage of an aircraft.

Consonant with the above listed objects, the present invention includes a door lock assembly for selectively operating the opening and closing of at least two inner and outer passage barriers or doors to control entry into the space defined between these barriers. Advantageously, the inventive door lock system operates to prevent an unauthorized entry into the cockpit area, which is usually a space enclosed in the forward fuselage of an airplane and designed as a pilot's cabin. In addition, part of this space can be used as a utility area located between the pilot's cabin and the first class section. Often, the utility area is configured as a front galley module. Application of the inventive door lock system, however, is not limited to the cockpit area and can be successfully utilized for controlling access to any restricted area on board.

In accordance with one aspect of the invention, the door lock system controls access into the cockpit area by controllably allowing a requestor to pass through the outer barrier, which can be any door or partition blocking or impeding the passage, while the inner door leading to the pilot's cabin is closed.

The inventive system provides security in at least three ways. It makes it difficult to forcibly gain entry by knocking down a single door, it allows time to evaluate the person in the mantrap before releasing him or her through either of the doors, and it allows entry of only one person at a time.

In accordance with another aspect of this invention, the door lock system does not allow the person to pass through the inner pilot cabin door until the outer barrier is closed and locked. Conversely, according to a further aspect of the invention, a voluntary exit from the controlled space is blocked unless the inner pilot cabin door is locked.

Still another aspect of the invention includes a manual mode of operation of the inventive system in which the automatic sequential opening of the inner and outer doors in case of emergency is disabled.

In accordance with a further aspect of the invention, the door lock system may include additional sensors capable of positively identifying authorized personnel. The entry may be allowed by using a variety of identifying means including, for example, biometric sensors capable of identifying voices, fingerprints and the like of authorized personnel. To further enhance the door lock system, a camera surveying the controlled area as well as a monitor connected to the camera and installed in the pilot's cabin can be automatically turned on in response to the unlocking and opening of the outer door. If the camera is constantly on, unobtrusive signaling means, such as weak sound and/or light signals, can attract attention of crewmember to the monitor in response to the operation of the outer door. In case of emergency, the door lock system can be provided with a controller setting a lock-in hijacking code, which can be transmitted to on-ground facilities in response to a signal generated by the crewmembers or automatically if certain safety conditions are not met. A satellite link establishing, for example, visual and sound contact between the aircraft and the monitoring on-ground facility, such as air traffic control (ATC) can be easily employed to provide such communication.

In a further aspect of the invention, the door lock system includes the sliding barriers. Because of the annular shape of the fuselage, at least the inner door leading to the pilot cabin is provided with a retractable corner to conform to the shape of the fuselage in an open position of the door.

BRIEF DESCRIPTION OF THE DRAWINGS

The above and other objects, features and advantages will become more readily apparent from the following detailed description, accompanied by the following drawings, in which.

DETAILED DESCRIPTION OF THE PREFERRED EMBODIMENTS

Figure 1:
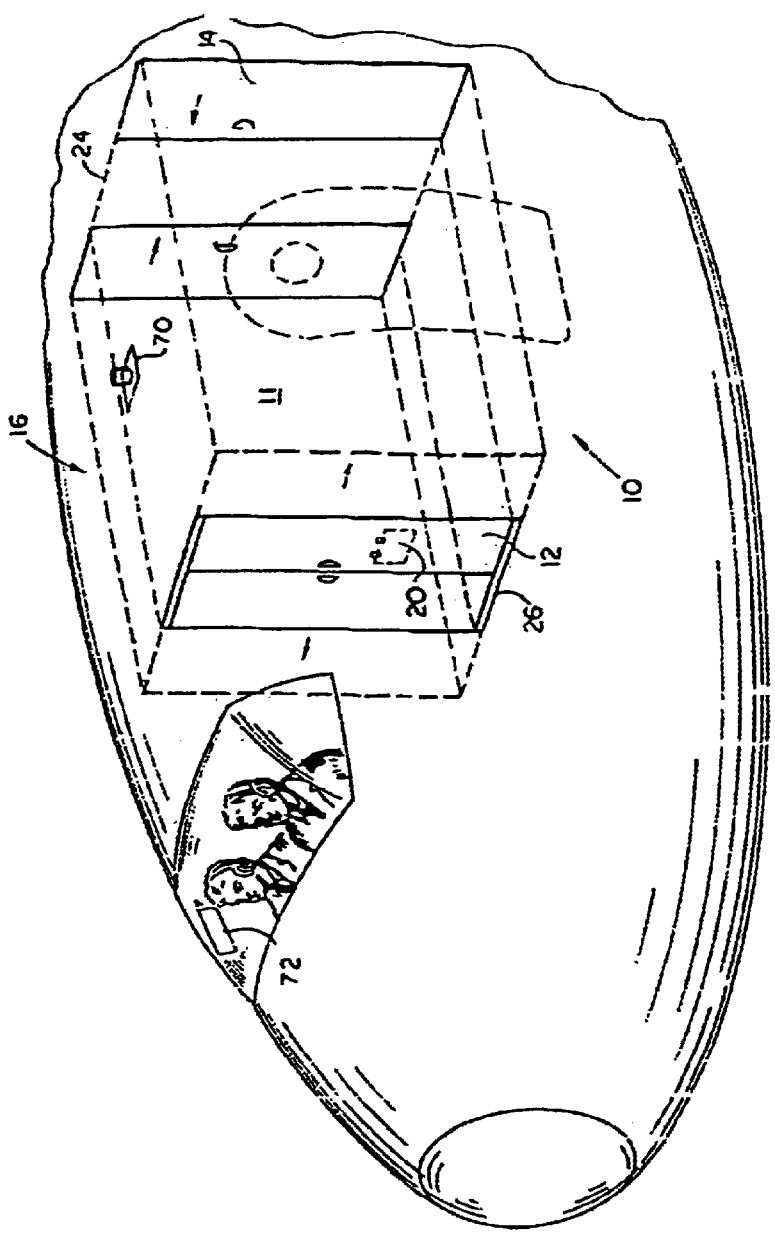
FIG. 1 is an isometric view of the inventive lock system controlling access to a restricted area in an aircraft.

According to the invention, a door-lock system 10, as shown in FIGS. 1–5, is operative to selectively actuate opening of an inner door 12 and an outer door 14 defining a restricted area 11 therebetween, which can be any desired area on board an aircraft. However, the cockpit area extending between the pilot cabin and the first-class section is particularly important because prevention of unwanted entry to the cockpit is paramount to the safety of the entire airplane. It is known to provide such an area with a front galley modulus 16 equipped with an oven, and other accessories necessary for serving the passengers with periodic meals, particularly the passengers resting in the first class section.

The outer door 14 leading to the first class section can be variously configured and does not have to be necessarily a solid structure designed to completely block the restricted area or front galley 16 from the first-class section. For example, a screen door having openings, which provide clear view of the section can serve as a reliable barrier. Thus, any displaceable barrier which, in a closed position, impedes the entry into the restricted area 11 is envisioned as part of the inventive system 10. If the outer door 14 has a solid skin, it is desirable to provide the latter with air passages 18 (FIG. 2), such as an array of small openings formed in the desired area of the outer door. The inner door 12 leading to the cockpit is preferably made from a bullet proof material capable of withstanding an effect produced by explosives. The skin of the inner door 12 is solid, but may have pressurization blow out panels 20 (FIG. 1) to keep the door unaffected in case of decompression in the area outside of the cockpit. Both doors can. be provided with bullet-proof windows 22 (FIGS. 2, 3) to facilitate visual surveillance of adjacent areas.

Figure 2:
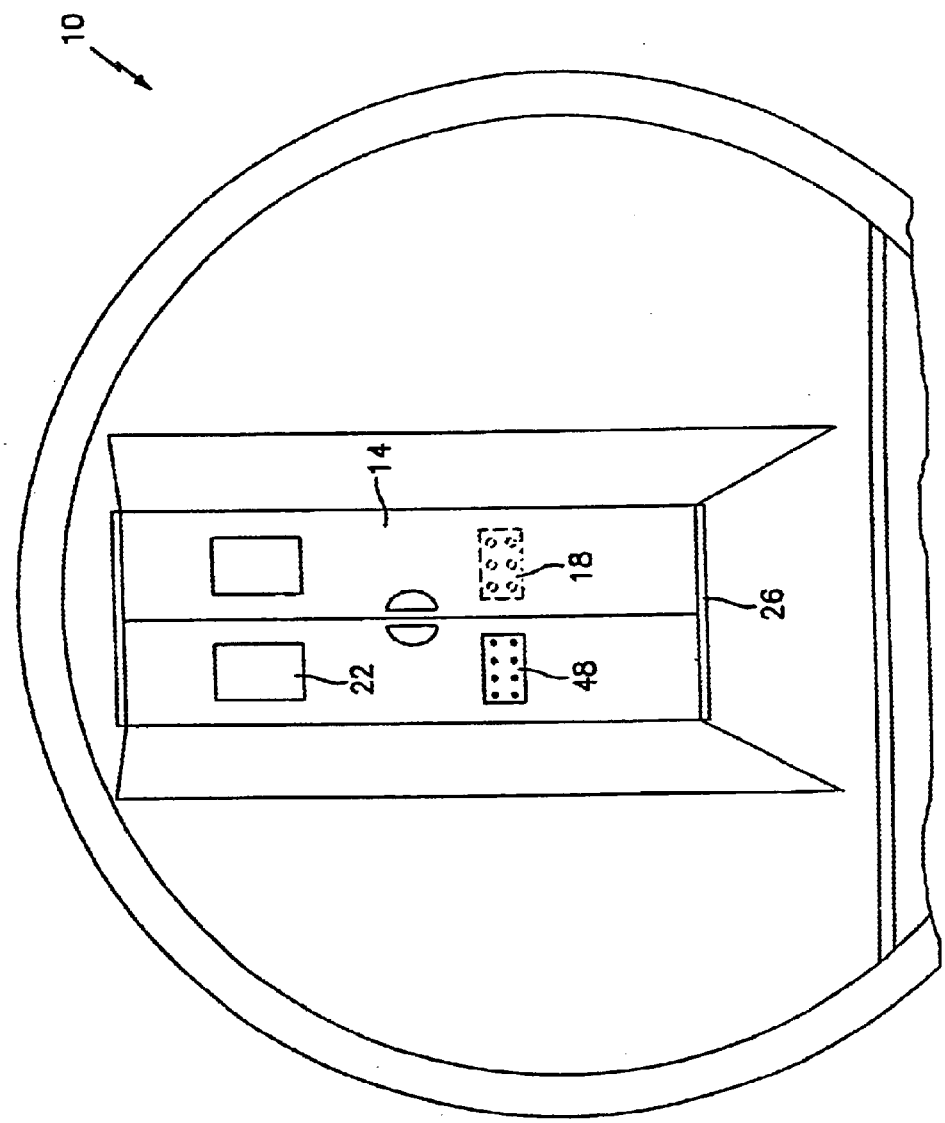
FIG. 2 is a view of one of the doors of the inventive door lock system shown in its closed position.
Figure 3:
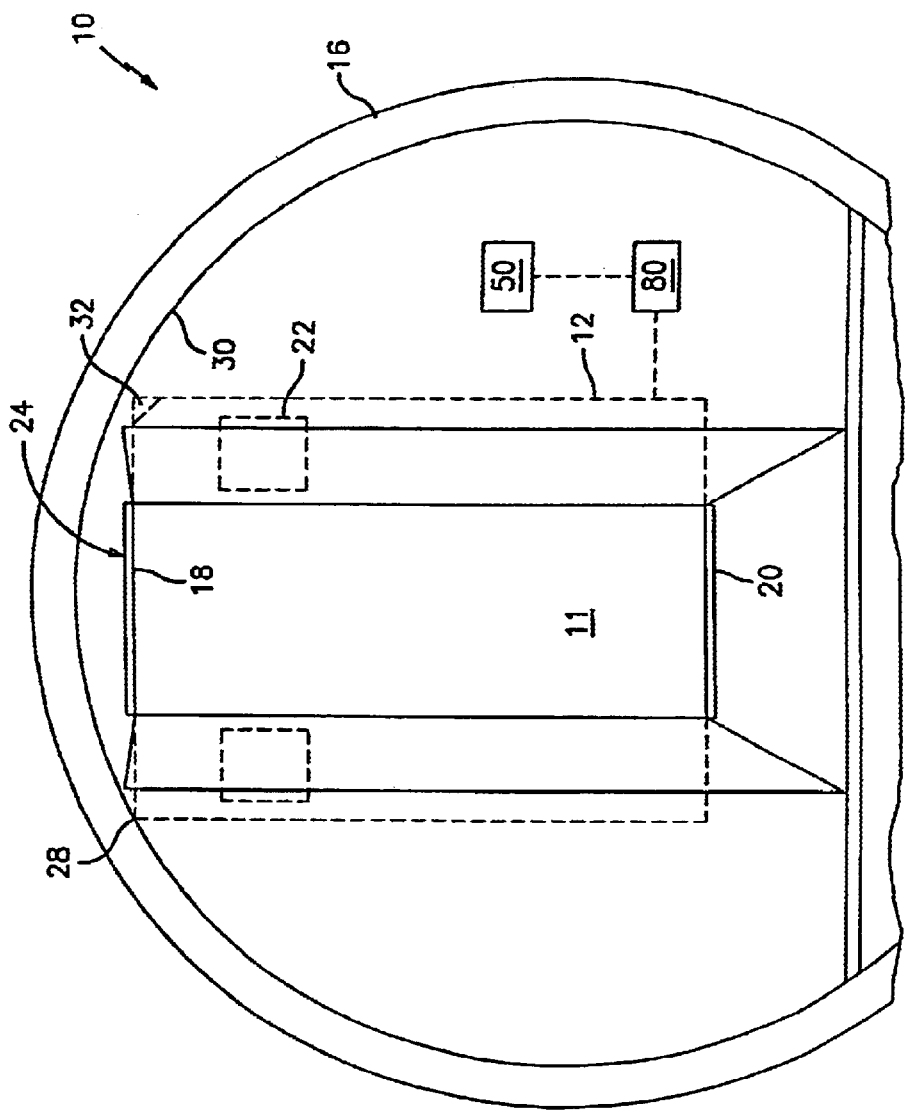
FIG. 3 is a view similar to FIG. 2, but illustrating the door in its open position.

While the inner 12 and outer 14 doors can be suspended on hinges and, thus, swing when operated, it is preferred to provide the system 10 with sliding doors, as better illustrated in FIGS. 1–3. Installing the front or any other galley module on board leaves plenty of room for sliding the doors between their open and closed positions. To accomplish it, each of the inner and outer doors defining the restricted area 11 is guided along a pair of upper 24 and lower 26 tracks. It is desirable to provide as broad an access into the galley as possible through the outer door 14 so as to facilitate displacement of beverage and food carts through this door and to facilitate boarding and deplaning of passengers. Structurally, however, a broad passage, particularly in case of a single sliding door, does not allow the door to fully clear this passage because the door's outer corner 28 (FIG. 3) does not conform to the annular periphery 30 of the fuselage.

Figure 4:
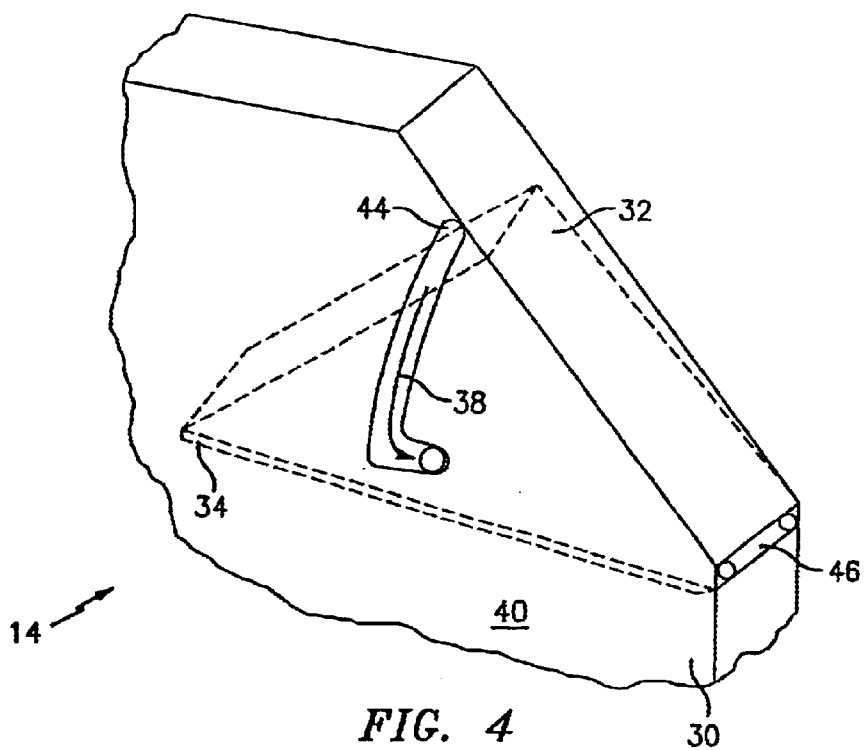
FIG. 4 is an isometric view showing an adjustable corner of one of the doors of the inventive system illustrated in the door's open position.
Figure 5:
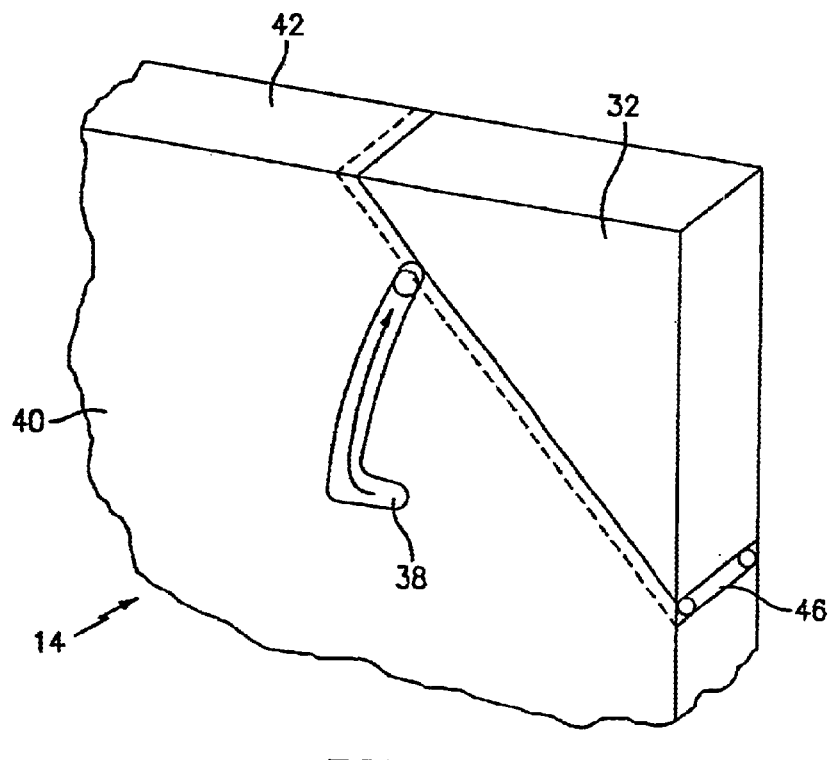
FIG. 5 is a view similar top the FIG. 5, but illustrating the corner in the closed position of the door.

As shown in FIGS. 4–5, to overcome such a structural deficiency, at least one of the doors, for example, the outer door 14, which may have two halves or be a single solid door, is provided with an adjustable corner 32. In accordance with one embodiment, the corner 32 is so dimensioned that it can swing into an interior position located within the interior of the door, as shown in FIG. 4. The corner 32 is only slightly narrower than the door and is dimensioned so as to provide a smooth displacement of the corner between a first position corresponding to the closed position of the door and a second position assumed by the corner in the open position of the door. As shown in FIG. 4, the edge of the corner 32 juxtaposed with the outer upper edge of the door can be provided with a flap 34 bridging a slight gap, which is formed between the door and the corner 32, when the door 14 is in the closed position.

A variety of actuators, including, for example, hydraulic, pneumatic or electromechanical actuators can be used to displace both doors 12, 14 as well as the corner 32 if desired. Once the entry into the restricted area 11 is authorized, as will be explained hereinbelow, software executed by a controller 50, provided in a convenient safe location, is operative to enable the actuators 80 (FIG. 3). The latter, in turn, provide each of the doors 12 and 14 with reciprocating sliding motion bringing them from the closed to open and then back to closed positions or states. In case of the adjustable corner, preferably the structure is a track and spring assembly. This includes a spring-loaded hinge 46 biasing the corner 32 to its normal position, in which the corner complements the rest of the door so that the latter has a typical rectangular shape, as shown in FIG. 5 and corresponding to the closed state of the door. However, as the door 14 slides to its open state, the periphery of the fuselage presses the corner 32 inwardly and upon overcoming the spring force, the corner is displaced in its interior position. Displacement of the corner allows the door to fully clear the passage into the front galley and restricted area 11. To ensure the correct displacement, a pivotal lever 38 is mounted between the front and back panels 40, 42 of the door 14 so that its free end 44 engages an inner surface of the corner 32, which may be formed with the track. Continuous engagement between the lever 38 and the corner 32 will guide the latter along a desired path between the interior position (FIG. 4) and the normal position (FIG. 5). If desired, the inner door 12 can be provided with an analogous system.

Figure 6:
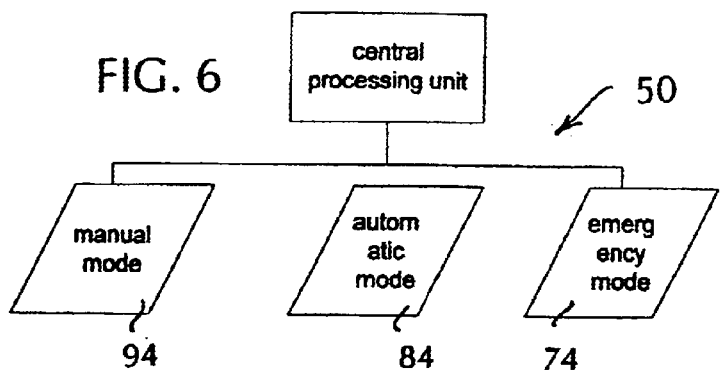
FIG. 6 is a view of a multi-mode control system operating the inventive door lock system.

It is desirable that the door lock system 10 have the controller 50 provided with software to operate the door lock system 10 in multiple modes. Referring to FIG. 6, the most frequently used mode of operations is an automatic mode 84. In this mode, the doors 12 and 14 can operate only in an alternating manner. If an emergency situation occurs requiring the involvement of on-ground facilities, such as air traffic control (ATC), the system is switched to an emergency mode 74 of operation. This mode is characterized by visual and/or sound communication between those on-board and the ATC. Finally, when it is desirable that both doors 12, 14 be open simultaneously, for example, when a pilot finds such opening of the doors desirable, the door lock system can work in a manual mode 94. Switching to the manual mode can be performed only from inside the cockpit or from the on-ground facility.

Figure 8:
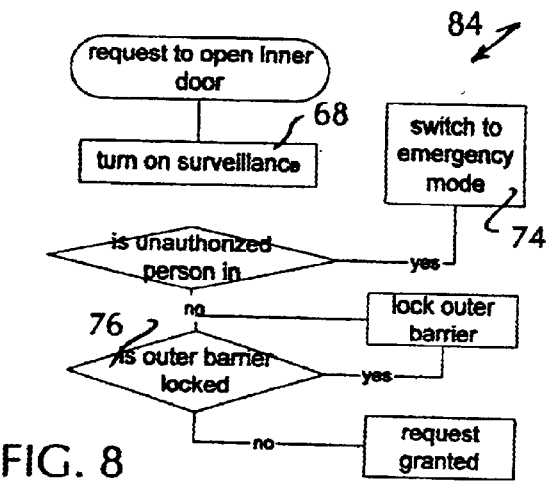
FIG. 8 is a flow chart illustrating the automatic mode of operation of the door lock system controlling entry into the restricted area from a pilot's cabin.
Figure 7:
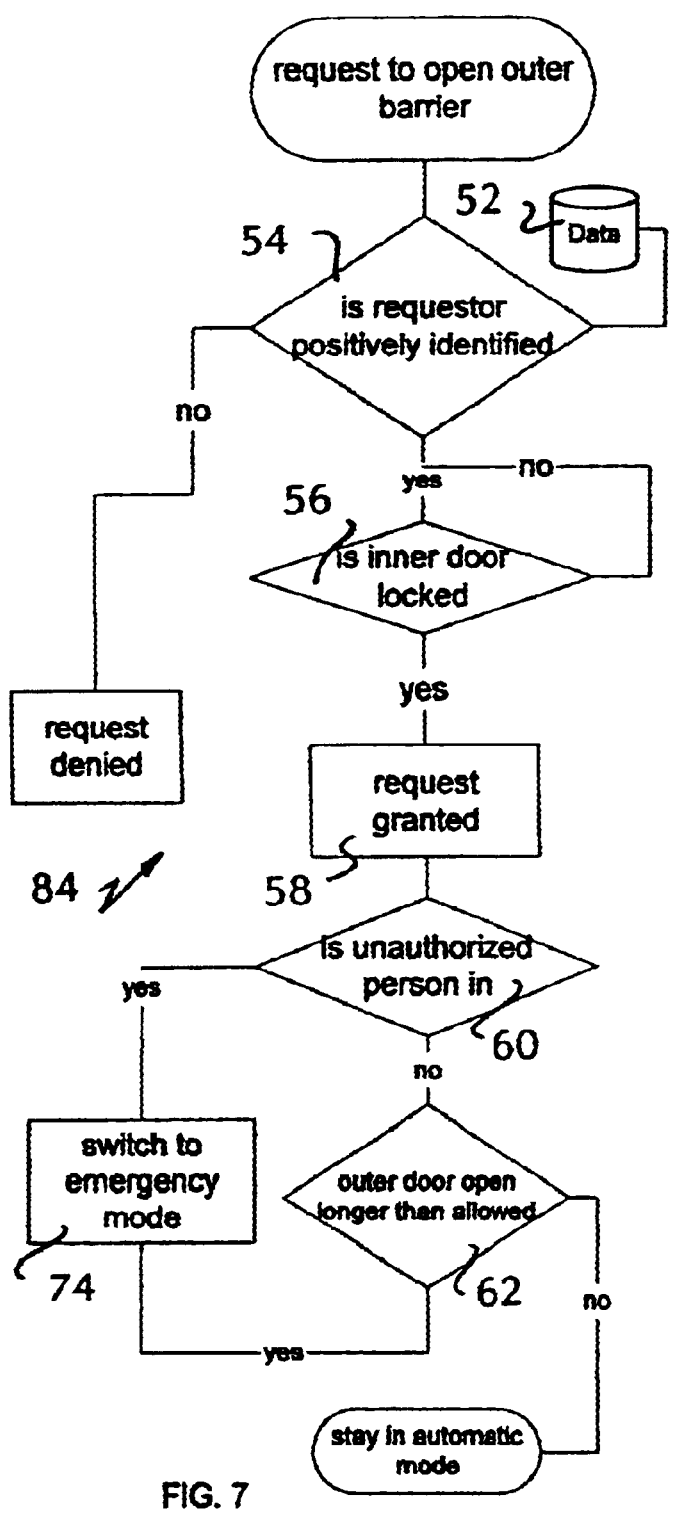
FIG. 7 is a flow chart illustrating the automatic mode of operation of the door lock system controlling entry into the restricted area from a passenger compartment.

The automatic mode of operation 84 of the door lock system 10, as shown in FIGS. 7 and 8, is a symmetrical system operated in response to a request to enter the restricted area through both the inner 12 and outer 14 doors. Particularly, when a request to enter is issued by a person standing outside the outer door 14 (FIG. 7) on the passenger side compartment, software executed by the controller 50 first identifies at 54 whether the requestor is authorized to have access. Request to enter can be implemented in various ways by using electronic, audio, video and any other equipment providing reliable recognition of the requestor. One of the most typical identification techniques includes keying an alphanumeric ID code assigned to each authorized person on board and stored in a database 52. A keypad 48 (FIG. 2) can be installed on the passenger compartment side of the door 14 so that it is easy to reach it even if the requester is pushing a beverage or food cart. Still another method of recognition is based on individual biometric data of the authorized persons, which can include, but not limited to, fingerprint, voice, face and other physiological traits. Again, all references are stored in the database 52. Following the positive recognition, a state of the inner door 12 is determined at 56 and, if the inner door 12 is closed, the request is granted at 58. However, the crew located in the pilot cabin may not notice who is entering the restricted area 11. To alert the designated member of the crew of the fact that of the request to enter the restricted area from the passenger compartment has been made, the inventive system automatically activates a surveillance means for providing video and audio surveillance. The surveillance means may include a camera 70 covering the restricted area 11 and a monitor 72 in communication with the camera 70, as better shown in FIG. 1. Activation of the camera 70 in response to the opening of the outer door 14 can generate a quiet sound or an unobtrusive light signal on the monitor 72 to focus the designated crew member's attention on the fact of entry, as diagrammatically shown at 60.

Thus, the automatic mode provides alternating opening of the inner and outer doors so the outer door 14 would not be open in response to a request to enter unless the locking state of the inner door 12 is checked and verified. The inner (pilot) door 12 must be closed and locked before the outer door 14 can be unlocked and opened. Conversely, for someone to leave cockpit, first, the restricted area first is checked, and then the locking state of the outer door is checked. Only after this double-check security procedure has been completed, the inner door 12 is unlocked and opens to allow the requestor to leave the pilot's cabin. For the requestor, who has just left the pilot's cabin, to proceed further into the passenger compartment, the inventive system must check if the inner door 12 has been locked, and only upon positive verification, the outer door 14 can be unlocked and opened to allow the requestor to enter the passenger compartment.

Figure 9:
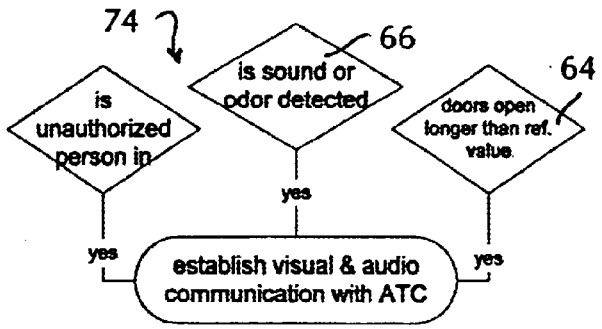
FIG. 9 is a flow chart illustrating the emergency mode of operation of the inventive door-lock system.

If it is determined that an unauthorized person has penetrated into the restricted area 11 and the situation is rather dangerous, the controller is switched in the emergency mode 74 in which direct video and audio communication is established between the on-ground monitoring facility and those on-board the airplane. Numerous methods of providing such communication are known and include, for example, a transducer for providing satellite communication. Typically, the designated person has a few seconds to observe the intruder and determine the intruder's intentions, as illustrated at 62, before the decision to manually switch the controller 50 in the emergency mode 74. However, the controller can be automatically switched into the emergency mode 74 if sensors located on board detect smell or a heightened level of sound, as indicated at 64, or the doors 12, 14 are open for a period longer than a reference or controlled period 66 (FIG. 9). These situations are, however, subject to a predetermined time delay, which prevents unnecessary alarm in response to accidental signals.

Referring to FIG. 8, in a sub-mode of the automatic mode 84, access into the restricted area 11 from the pilot cabin may require some delay before the inner door is displaced in the open state. This time is stored in software executed by the controller 50 to first turn on the surveillance equipment at 68 to provide the requestor with the view of the restricted area 11. If the requester notices impropriety in the area and, thus, does not proceed with opening of the inner door 12 within a predetermined period of time, the controller 50 can be switched to the emergency mode 74. Furthermore, during the delay period for switching the controller in the emergency mode 74, the status of the outer door 14 is determined at 76. If the outer door 14 is open, it is automatically brought in the closed position.

Numerous types of locks can be used in conjunction with the inventive system. For example, it is possible to use a bayonet connection type of lock, which can be actuated automatically once the door reaches its closed position.

The invention is not limited to the disclosed preferred embodiment, and should be construed to cover such alternatives, modifications and equivalents as defined in the appended claims.

What is claimed is:

1. A door lock security system installed on board an airplane, comprising:
   a plurality of spaced doors defining a restricted area therebetween, at least one of the doors being slidable and having a pivoting corner to conform a contour of the slidable door with that of fuselage of the airplane; and
   a controller operative to selectively open the spaced doors to control entry into the restricted area.

2. The door lock system of claim 1, wherein the controller is operative to function in an automatic mode, wherein the doors open alternately to prevent simultaneous entry into the restricted area from opposite directions.

3. The door lock system of claim 2, further comprising a sensor located in the vicinity of an outer surface of one of the plurality of doors and operative to generate an enabling signal in response to a request to enter the restricted area.

4. The door lock system of claim 3, wherein the sensor is an electronic keypad coupled to the controller and operative to generate the output signal in response to an alphanumeric combination inputted by the requester.

5. The door lock system of claim 4, further comprising a database for storing alphanumeric combinations of authorized personnel, the controller being in communication with the database and having software for comparing the inputted combination and the stored combinations to generate an enabling signal in response to coincidence of the input and one of the stored combinations.

6. The door lock system of claim 3, wherein the sensor is a biometric sensor operative to generate an input signal corresponding to a physiological characteristic of a requestor selected from voice, facial features, fingerprints and a combination of these, the system further comprising a database for storing respective physiological characteristics of authorized personnel and software executed by the controller for querying the database to compare the input and stored characteristics and to generate the enabling signal upon positive identification of the requester.

7. The door lock system of claim 5, further comprising a plurality of door actuators each operatively connected with and opening a respective door for a controlled period of time in response to receiving the enabling signal.

8. The door lock system of claim 7, wherein the actuators are selected from the group consisting of pneumatic, hydraulic, electrical and a combination of these.

9. The door lock system of claim 1, wherein the controller is operative to switch to an emergency mode, in which the restricted area is in audio and/or visual communication with an on-ground facility.

10. The door lock system of claim 9, further comprising a transducer coupled to the controller and operative to generate an emergency signal through a communication link in response to a control signal generated by the controller, or in response to the control signal originated in a pilot's cabin of the airplane, the doors including an outer door separating a passenger space from a front galley module and an inner door between the front galley module and the pilot's cabin.

11. The door lock system of claim 10, further comprising an audio/visual system including a video camera surveying the restricted area between the inner and outer doors and a monitor located in the pilot's cabin and in communication with the video camera.

12. The door lock system of claim 11, wherein the video camera and the monitor are switched to an on-state simultaneously with the opening of the outer door and operating for a controlled period of time.

13. The door lock system of claim 12, wherein visual and sound signals indicative of the on-state of the monitor are generated in response to the opening of the outer door.

14. The door lock system of claim 11, wherein the video camera and the monitor are in an on-state in response to an input signal generated by a requestor located in the pilot cabin to provide visual surveillance of the restricted area.

15. The door lock system of claim 1, wherein the controller is operative to function in a manual mode, wherein the plurality of doors are opened simultaneously in response to a request signal originated by an on-ground facility or in a pilot's cabin of the airplane.

16. A method for controlling an entry to a cockpit area on board an airplane defined between an outer door leading to a passenger compartment and an inner door leading to a pilot's cabin, comprising the steps of:

providing the inner door operative to move between a locked and open position;

providing the outer door spaced from the inner and operative to move between a locked and open position;

providing a plurality of sensors each being in communication with a respective one of the inner and outer doors and operative to generate a first input signal in response to a request to enter the restricted area from the pilot's cabin and a second input signal in response to a request to enter the restricted area from the passenger compartment;

providing at least one door actuator operatively connected to the inner and outer door and operative to displace each of the inner and outer doors between respective open and locked positions;

providing a control system in communication with the plurality of sensors and with the at least one door actuator and operative to sequentially
a) receive the first input signal from the sensor coupled to the inner door,
   verify the locked position of the outer door,
   generate a first output signal enabling the at least one door actuator to displace the inner door to the open position thereof for a desired period of time only upon positive verification of the locked position of the outer door,
   generate a second output signal enabling the at least one door actuator to displace the inner door to the locking position, and
   generate a third output signal enabling the at least one door actuator to displace the outer door to the open position, thereby allowing a requestor to enter the passenger compartment; and
b) receive the second input signal from the sensor coupled to the outer door,
   verify the locked position of the inner door,
   generate a fourth output signal enabling the at least one door actuator to displace the outer door to the open position thereof for a desired period of time only upon positive verification of the locked position of the inner door,
   generate a fifth output signal enabling the at least one door actuator to displace the outer door to the locking position upon termination of the desired period of time, and
   generate a sixth output signal enabling the at least one door actuator to displace the inner door to the open position in response to a request made inside the restricted if the request id made from inside the restricted area.

* * * * *